Jan. 7, 1941. E. CANNON 2,227,629
PRESSURE CONTROL VALVE AND THE LIKE
Filed Dec. 14, 1937 2 Sheets-Sheet 1
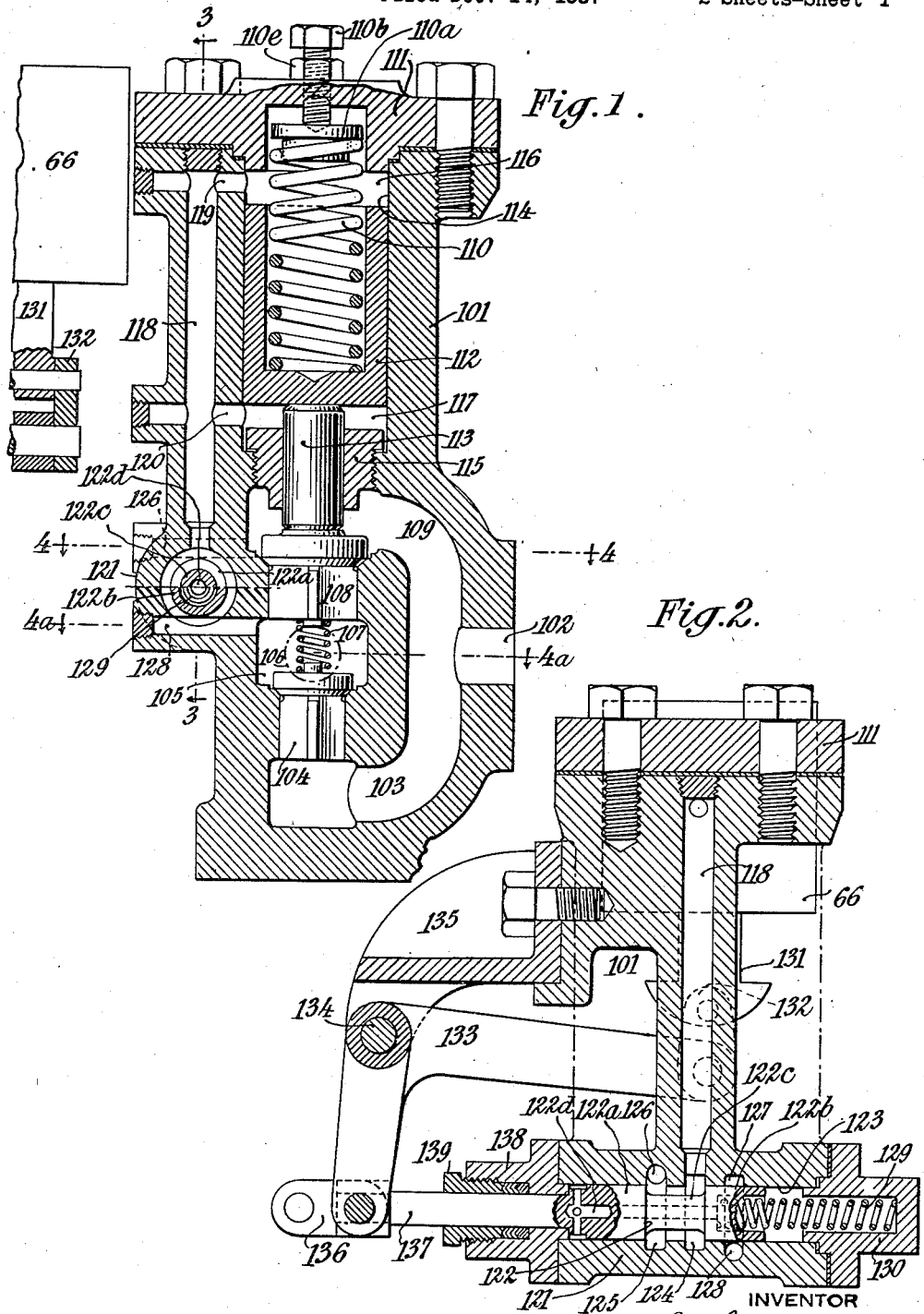
INVENTOR
Earl Cannon,
BY
Fraser, Myers & Manley
ATTORNEYS.

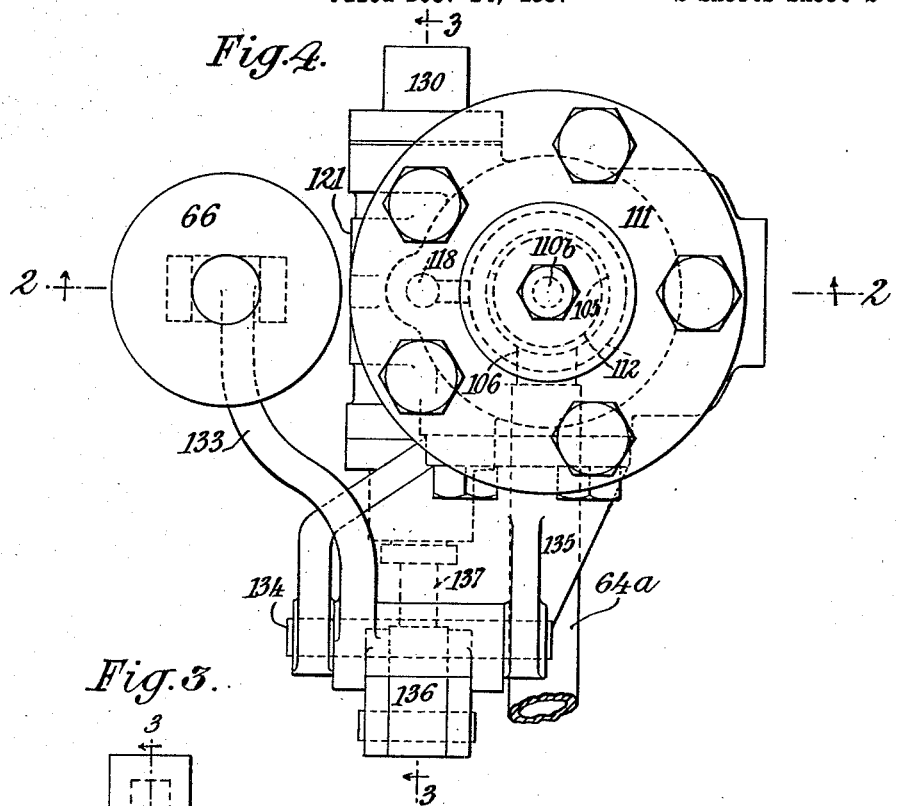
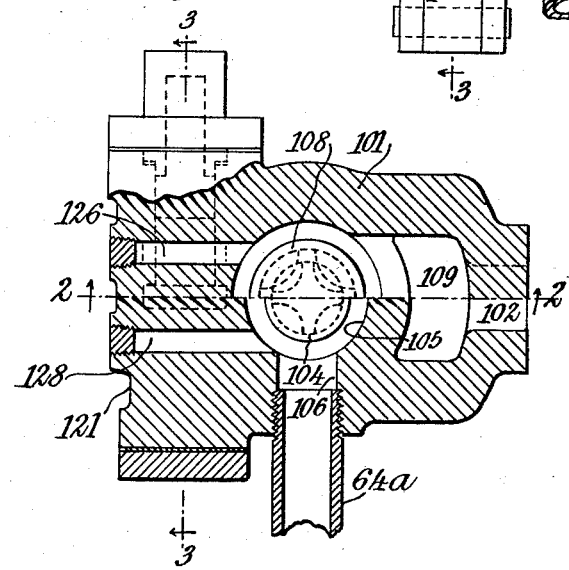

Patented Jan. 7, 1941

2,227,629

UNITED STATES PATENT OFFICE 2,227,629

PRESSURE CONTROL VALVE AND THE LIKE

Earl Cannon, Rockville Centre, N. Y., assignor to E. W. Bliss Company, Brooklyn, N. Y., a corporation of Delaware Application December 14, 1937, Serial No. 179,657

1 Claim. (Cl. 137—139)

This invention relates to pressure control valves, and more particularly to a type of valve adapted to control the passage of fluid through a pipe line in which it is connected, and hence to control fluid pressure in said line at the intake side of the valve.

In various types of hydraulically-operated machinery such, for example, as hydraulic presses, it is desirable to control the passage of fluid through a conduit so that at times fluid passes therethrough substantially unimpeded, and at other times the passage of fluid therethrough is restrained so that pressure may be built up in one portion of the conduit and in any passages or chambers directly connected thereto. Such pressure control may, for example, be used in hydraulic presses to either directly or indirectly retard the advance of the ram of the press. Although the present invention is particularly useful in the fluid circulating systems of certain types of hydraulic presses, it would be useful also in various other types of hydraulically-controlled or operated machines.

An important object of the present invention is the provision of an improved pressure-control valve wherein the fluid pressure at the intake side of the valve is employed to exert hydraulic pressure within the valve, tending to increase its restraint upon the passage of fluid therethrough.

Other objects of the invention will be perceived from the following description and the accompanying drawings, in which:

Figure 1 is a central vertical section of a variable pressure-control valve according to the present invention, the section being taken substantially on the lines 2—2 of Figs. 4 and 5.

Figure 2 is a vertical section on the lines 3—3 of Figs. 1, 3 and 4.

Figure 3 is a horizontal section, the upper portion being taken on the line 4—4 of Fig. 1, and the lower portion being taken on the line 4a—4a of Fig. 1.

Figure 4 is a top plan view of the variable pressure-control valve illustrated in Figs. 1, 2, and 3.

Referring to the drawings, a pressure-control valve according to the present invention, may comprise a suitable valve casing 101 which houses the working parts of the valve. Although the valve is adapted to pass fluid in opposite directions therethrough, nevertheless the control is accomplished only upon fluid passing in one direction through the valve. Therefore, reference in this specification to an intake port or receiving passage or a discharge passage or port, relates only to the variably controllable passage of fluid through the valve.

In so far as the valve permits substantially uncontrolled flow of fluid through the valve in one direction, fluid may enter the valve through a port 102 in the valve casing, (referring to Fig. 1), thence downwardly through a passage 103, thence upwardly past a check valve 104 into a central chamber 105. The fluid may then pass from the latter chamber through a port 106 (indicated in broken lines in Fig. 1), but more clearly shown in Fig. 3, and into pipe line 64a. The check valve 104 is only lightly loaded by a compression coil-spring 107 seated between the said check valve 104 and another check valve 108 which is suitably retained in place and functions in a manner hereinafter explained.

It will be understood that the valve is adapted for connection in a single pipe line in which, on occasions, fluid may pass in either direction. As just described, the passage of fluid is substantially uncontrolled in the sense that the valve is not adapted to vary the restraint upon the passage of fluid therethrough. However, when fluid is passed in the opposite direction through the valve, that is to say, into the valve through port 106 and out of the valve through port 102, variations in the restraint upon the passage of fluid may be effected. The following description refers particularly to passage of fluid through the valve in the last-mentioned direction unless otherwise specifically indicated. Fluid, upon entering the port 106, passes into the central chamber 105, thence upwardly past check valve 108 into a discharge passage 109, which connects with the port 102 through which the fluid passes in leaving the valve. It will be seen that during passage of the fluid through the valve in the manner just described, the check valve 104 is held closed by the compression coil-spring 107.

The check valve 108 is loaded by a loading coil-spring 110; the upper end of which seats upon a spring cap 110a which bears against the inner end of a tensioning bolt 110b threaded through a valve head 111, the latter being suitably bolted or otherwise secured to the valve casing. The tensioning bolt 110b may be turned in or out to adjust the tension of the spring 110, and a lock nut 110c serves to lock the said tensioning bolt after a desired adjustment of the tension of the spring 110 has been obtained. The lower end of the spring 110 seats within a hollowed-out piston 112 which coacts with a plunger 113 to transmit the tension of the spring 110 to the check valve 108. The piston 112 is accurately fitted for hydraulic reciprocation within a bore 114 in the upper part of the valve casing 101, and the plunger 113 extends through a bushing 115 which may be in the form of a stuffing box or otherwise may be adapted to prevent any substantial passage of fluid around said plunger.

The structure of the valve, as thus far described, provides for the passage of fluid through the valve under relatively light restraint as imposed by the check valve 108 loaded only by the spring 110. Means are provided, however, whereby the spring loading of the check valve 108 may be augmented through the medium of pressure from the central chamber 105, provision being made for the imposition of such pressure upon the plunger 113 and through the latter upon the top of the check valve 108.

The area within the bore 114 above the piston 112 (hereinafter referred to as positive bias chamber 116) is at all times in fluid communication with the area within the bore 114 below the said piston (hereinafter referred to as negative bias chamber 117) through a vertical passage 118, and lateral passages 119 and 120 in the valve casing. Provision is made for selectively connecting the vertical passage 118 and the connected bias chambers 116 and 117 either with the exhaust passage 109 above the check valve 108 or with the central chamber 105 below said check valve for the purpose of subjecting the plunger 113 and the check valve 108 to either the relatively low fluid pressure present in said passage, or to the relatively high fluid pressure present in the said central chamber.

In a structure as illustrated in Fig. 1, it is probable that fluid would be present between the coacting surfaces of the piston 112 and the plunger 113, with the result that whatever fluid pressure may be present in the bias chambers 116 and 117, would act equally upon the equal top and bottom surfaces of the piston 112, and also, would act downwardly upon the upper end of the plunger 113 and oppose the hydraulic force acting upon the under side of the valve 108. Although the hydraulic forces acting upon the top and bottom of the piston 112 are substantially balanced, nevertheless said piston is held in contact with the plunger 113 by the spring 110, and hence the force of said spring is transmitted to the check valve 108. Thus the force of the spring 110 and the hydraulic forces acting upon the exhaust check valve 108 through the plunger 113, operate as a combined force tending to hold the check valve 108 seated against the pressure of fluid in the central chamber 105.

It should be apparent that the piston 112 and the plunger 113 may be integral, under which arrangement the downward hydraulic force transmitted to the exhaust check valve 108 through the plunger 113 would be the same as if the piston and plunger were formed separately. If said parts were integrally formed, the hydraulic force acting downwardly upon the valve 108 would be the hydraulic force acting upon the top of the piston 112, minus the hydraulic force acting upon the bottom thereof, and as the hydraulic force acting on the bottom of the piston would be less to the extent of the pressure computed with reference to the cross-sectional area of the plunger 113, it follows that the total hydraulic force, derived from bias chambers 116 and 117 for augmenting the force of the spring 110 would be the hydraulic pressure within said chambers computed with reference to the cross-sectional area of said plunger 113, precisely the same as in the case where the piston and plunger are separately formed.

When the bias chambers 116 and 117 are connected to the exhaust passage 109 they derive little or no effective fluid pressure therefrom, and the load tending to hold the check valve 108 closed is derived chiefly from the loading coil-spring 110, hence only a relatively light back pressure is present in the central chamber 105. It is understood, of course, that the tension of the loading coil-spring 110 is properly adjusted to impose the desired relatively light restraint upon the passage of fluid through the valve.

When the bias chambers 116 and 117, however, are connected to the central chamber 105, the relatively high pressure which is present in said chamber, as compared to the pressure present in discharge passage 109, is transmitted to the said bias chambers and hence the plunger 113 derives a net force from such high pressure which substantially augments the force of the loading coil-spring 110 and thus imposes an additional load upon the check valve 108. This additional load has the effect of imposing an increased restraint upon the passage of fluid through the valve and of accumulating an increased back pressure in the central chamber 105.

Means are provided for shifting the connection of the passage 118 and the bias chambers 116 and 117 from the exhaust passage 109 to the central chamber 105, and vice versa, for the purpose of varying the restraint to the passage of fluid through the valve and also for varying the back pressure in the central chamber 105 and in any conduits or chambers in other mechanisms connected thereto. To this end a piston valve 121 is provided, the body thereof preferably being formed integrally with the casing 101. This piston valve comprises a double-headed piston 122 fitted accurately within a bore 123 toward the center of which are provided three annular chambers, one of said chambers, numbered 124, being preferably located centrally within said bore in fluid communication with the vertical passage 118, as best seen in Fig. 2. Another of said annular chambers, numbered 125, is suitably spaced from the chamber 124 toward one side thereof and is in fluid communication with the exhaust passage 109 through a lateral passage 126, and the third of said annular chambers, numbered 127, is in fluid communication with the central chamber 105 through a lateral passage 128, as best seen in Fig. 3.

The piston 122 has heads 122a and 122b at opposite ends thereof and a neck 122c intermediate said heads. When said piston is in the extreme left position, as shown in Fig. 2, the area around the neck 122c affords fluid communication between the annular chambers 124 and 125, and the piston head 122b covers the annular chamber 127. In the position just referred to only the relatively low pressure in the exhaust passage 109 is communicated to the bias chambers 116 and 117, and little or no additional load is imposed thereby upon the valve 108. When the piston 122 is moved to an extreme right position, the area around the neck 122c affords fluid communication between the annular chambers 124 and 127, and the piston head 122a covers the annular chamber 125. In this position the relatively high pressure in the central chamber 105 is communicated to the bias chambers 116 and 117, and sufficient additional bias may thereby be imposed upon the check valve 108 to increase the restraint upon fluid passing through the valve and to increase the pressure in the central chamber 105 and in any conduits or chambers of connected mechanisms.

A coil-spring 129 coacts with one end of the piston 122 and with a cap 130 closing one end of the bore 123, whereby to urge the said piston toward its extreme left position, as shown in Fig. 2, while said piston is moved to its extreme right position by an electric solenoid 66 in a manner well understood in the art. A plunger 131 of the said solenoid may be pivotally connected by a link 132 to one end of a bell-crank lever 133, fulcrumed at 134 upon a bracket 135 which may be suitably mounted upon the casing 101. The other end of the bell-crank 133 may be pivotally connected through a link 136 to the outer end of extension 137 of the piston 122, said extension passing through a cap 138 and a suitable stuffing box 139. Thus, when the solenoid 66 is electrically energized, the piston 122 moves to its extreme right position against the compression of the coil-spring 129, and when said solenoid is de-energized the piston moves back to its extreme left position under the expansive forces of said spring. The coaxial passage 122d may be provided in the said piston to permit interchange of fluid between the areas at opposite ends thereof, or said areas may be suitably vented to prevent locking of the piston.

The solenoid 66 is conventionally connected to a source of electric energy, such connection, however, not being shown as such showing is not necessary to an understanding of the invention. Likewise, it will be understood that a suitable electric switch or circuit breaker may be employed in the electric circuit supplying such energy, and that in any machinery in which the present valve is employed, such a switch may be operated either manually or automatically, at any desired stage in a cycle of operation whereby to operate the valve either to impose a relatively light restraint upon the passage of fluid therethrough, and consequently to establish only a relatively light back pressure at the intake side of the valve or to offer substantial restraint to the passage to fluid therethrough and hence to establish a substantial back pressure at the intake side of the valve.

Although, as hereinbefore stated, the present invention may be employed in various types of hydraulic machinery, a fuller understanding of the invention may be obtained by considering its operation in connection with a hydraulic press. The present invention may be advantageously employed in a hydraulic press structure as disclosed in United States Letters Patent No. 2,152,837, issued under date of April 4, 1939. The said patent discloses a hydraulic press having a prefill valve which is normally open during the greater part of the advance stroke of the press whereby to permit fluid to be drawn rapidly into the ram chamber of the press in substantial volume. The ram of the press illustrated in said patent is caused to advance rapidly during a substantially initial portion of its advance stroke by means of fluid injected under pressure through a centrally located supply tube into a relatively small hydraulic chamber located within the ram itself. During this rapid advance portion of the stroke, fluid is being discharged from return or push-back chambers, and the prefill valve meanwhile remains open. One of the characteristics of the prefill valve disclosed in said patent is that when the ram of the press is substantially impeded during its advance stroke, the pressure of the fluid being pumped into the press increases substantially and automatically causes the prefill valve to close, after which fluid under pressure may continue to pass into the press, but instead of going only into the small hydraulic chamber employed in the rapid initial advance of the ram, it passes into the main ram chamber and hence the continued advance of the ram proceeds at much reduced speed and greater hydraulic force may be applied to the ram because of the larger areas of the two chambers within which the high pressure fluid continues to operate.

It will be obvious that in such a press the prefill valve may be caused to close, and hence the speed of the advance of the ram may be materially reduced, either by the resistance which the ram and the die carried thereby may encounter upon the die engaging the material being worked, or by the expedient of establishing pressure in the ram return chamber shortly before engagement of the die with the material. Where it is desired to avoid impact of the die with the material being worked, the latter expedient naturally would be preferred.

In order to avoid such impact in the operation of such a hydraulic press structure, a valve according to the present invention may be connected in the conduit employed to effect discharge of the ram return or push-back chamber, with the intake side of the valve nearest to the said chamber. With the valve so connected, the solenoid 66 and its controlling electric connections may be so arranged that during the rapid advance portion of the stroke of the press the said solenoid is not energized and hence the piston 122 would be disposed as shown in Fig. 2, in which position the bias chambers 116 and 117 are connected through the lateral passage 126 to the exhaust passage 109 in which the fluid, being on the discharge side of the check valve 108, is at relatively low pressure; hence, during the rapid advance portion of the stroke of the ram the fluid being exhausted from the ram return chamber would suffer only slight impediment to its passage through the valve.

Let us assume, however, that an electric switch or circuit breaker, disposed in the electric circuit controlling the solenoid 66, is so arranged on or adjacent to the slide of the press that it is engaged and closed by a suitable abutment carried by said slide just before the die engages the material being worked. Immediately upon the closing of such switch or circuit breaker the solenoid 66 becomes energized and immediately shifts the piston 122 toward the right as viewed in Fig. 2, thus connecting the bias chambers 116 and 117 of the valve with the central chamber 105 through lateral passage 128 (see also Figs. 1 and 3). Thereupon the bias chambers 116 and 117 immediately become subject to the relatively high pressure in the central chamber 105 at the intake side of the check valve 108, and said bias chambers exert a substantial net force upon the check valve 108 through the plunger 113, thus very substantially impeding the passage of fluid through said check valve, and in consequence substantially increasing the back pressure in the ram return or push-back chamber of the press. As a result of this increased back pressure the prefill valve of the press immediately closes, whereupon the advance of the ram continues at a much reduced speed and increased hydraulic force may be applied to the ram of the press to complete the work of the advance stroke.

The invention is not intended to be limited to the specific form which has been described and disclosed herein and in the accompanying drawings for the purposes of illustration, but should be regarded as including modifications and variations thereof within the scope of the appended claim.

I claim:

A variable pressure control valve or the like comprising a receiving passage, a discharge passage, a port between said passages permitting movement of fluid from the former to the latter passage, a check valve adapted to close said port, a spring arranged to impose a load upon said check valve urging the latter closed against pressure in said receiving passage, hydraulic means, augmenting said spring, and also adapted to impose a load upon said check valve, and a controlling mechanism, adapted to connect or disconnect the said hydraulic means relatively to the said receiving passage, whereby respectively to render said check valve substantially responsive either to both the said spring and hydraulic means or to the said spring alone, the said hydraulic means comprising a hydraulically actuated piston adapted to transmit force to said check valve, a hydraulic positive bias chamber, adapted to co-act with the piston to impose an inwardly-acting load thereupon, a hydraulic negative bias chamber, adapted to co-act with the piston to impose an outwardly-acting load thereupon, partly offsetting the said inwardly-acting load, and connecting passages affording hydraulic communication between both said bias chambers and the receiving passage, the said controlling mechanism controlling the communication of pressure through said connecting passages to establish a common pressure in both said bias chambers and in the receiving passage.

EARL CANNON.